(12) United States Patent
Uchida et al.

(10) Patent No.: US 11,641,448 B2
(45) Date of Patent: May 2, 2023

(54) INFORMATION PROCESSING APPARATUS AND INFORMATION PROCESSING METHOD

(71) Applicant: SONY CORPORATION, Tokyo (JP)

(72) Inventors: Tetsuhiro Uchida, Kanagawa (JP); Yusuke Sakai, Kanagawa (JP); Miwa Ichikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 17/288,744

(22) PCT Filed: Oct. 25, 2019

(86) PCT No.: PCT/JP2019/041998
§ 371 (c)(1),
(2) Date: Apr. 26, 2021

(87) PCT Pub. No.: WO2020/095728
PCT Pub. Date: May 14, 2020

(65) Prior Publication Data
US 2021/0399913 A1     Dec. 23, 2021

(30) Foreign Application Priority Data

Nov. 6, 2018 (JP) .............................. JP2018-208707

(51) Int. Cl.
*H04N 7/14* (2006.01)
*H04L 12/18* (2006.01)
(Continued)

(52) U.S. Cl.
CPC ......... *H04N 7/147* (2013.01); *H04L 12/1827* (2013.01); *H04L 47/2433* (2013.01); *H04L 65/70* (2022.05)

(58) Field of Classification Search
None
See application file for complete search history.

(56) References Cited

U.S. PATENT DOCUMENTS 9,473,741 B2 * 10/2016 Nakatomi ................ H04N 7/15
9,894,320 B2 *  2/2018 Uchiyama .............. H04N 7/147
(Continued)

FOREIGN PATENT DOCUMENTS

| JP | 2004-343328 A | 12/2004 |
| JP | 2008-067350 A | 3/2008 |

(Continued)

OTHER PUBLICATIONS

Perkins, RTP Audio and Video for the Internet, Jun. 12, 2003, pp. i-275.

*Primary Examiner* — Quoc D Tran
(74) *Attorney, Agent, or Firm* — Paratus Law Group, PLLC

(57) ABSTRACT

There is provided an information processing apparatus and an information processing method capable of reducing a sense of delay given to a user. The information processing apparatus includes an acquisition section; an encoding section; a context recognition section; a priority data extraction section; and a communication section. The acquisition section acquires data relating to a transmission point. The encoding section encodes the data relating to the transmission point. The context recognition section sets data to be preferentially transmitted from the data relating to the transmission point on the basis of a situation of the transmission point recognized using the data relating to the transmission point. The priority data extraction section extracts the preferentially transmitted data as priority data on the basis of a setting in the context recognition section. The communication section transmits the data encoded by the encoding section and unencoded priority data to an information processing apparatus at a reception point.

8 Claims, 5 Drawing Sheets

(51) Int. Cl.
*H04L 47/2425* (2022.01)
*H04L 65/70* (2022.01)

(56) References Cited

U.S. PATENT DOCUMENTS

| | | | |
|---|---|---|---|
| 2012/0300016 A1* | 11/2012 | Li | H04L 65/403 |
| | | | 348/E7.083 |
| 2012/0314948 A1 | 12/2012 | Raveendran et al. | |
| 2013/0093853 A1* | 4/2013 | Iwami | H04N 19/63 |
| | | | 348/46 |
| 2015/0189008 A1* | 7/2015 | Karkkainen | H04N 7/15 |
| | | | 709/204 |
| 2016/0173821 A1* | 6/2016 | De Magalhaes | H04N 5/2628 |
| | | | 348/14.08 |
| 2018/0176508 A1 | 6/2018 | Pell | |

FOREIGN PATENT DOCUMENTS

| | | |
|---|---|---|
| JP | 2009-076952 A | 4/2009 |
| JP | 2013-031191 A | 2/2013 |

* cited by examiner

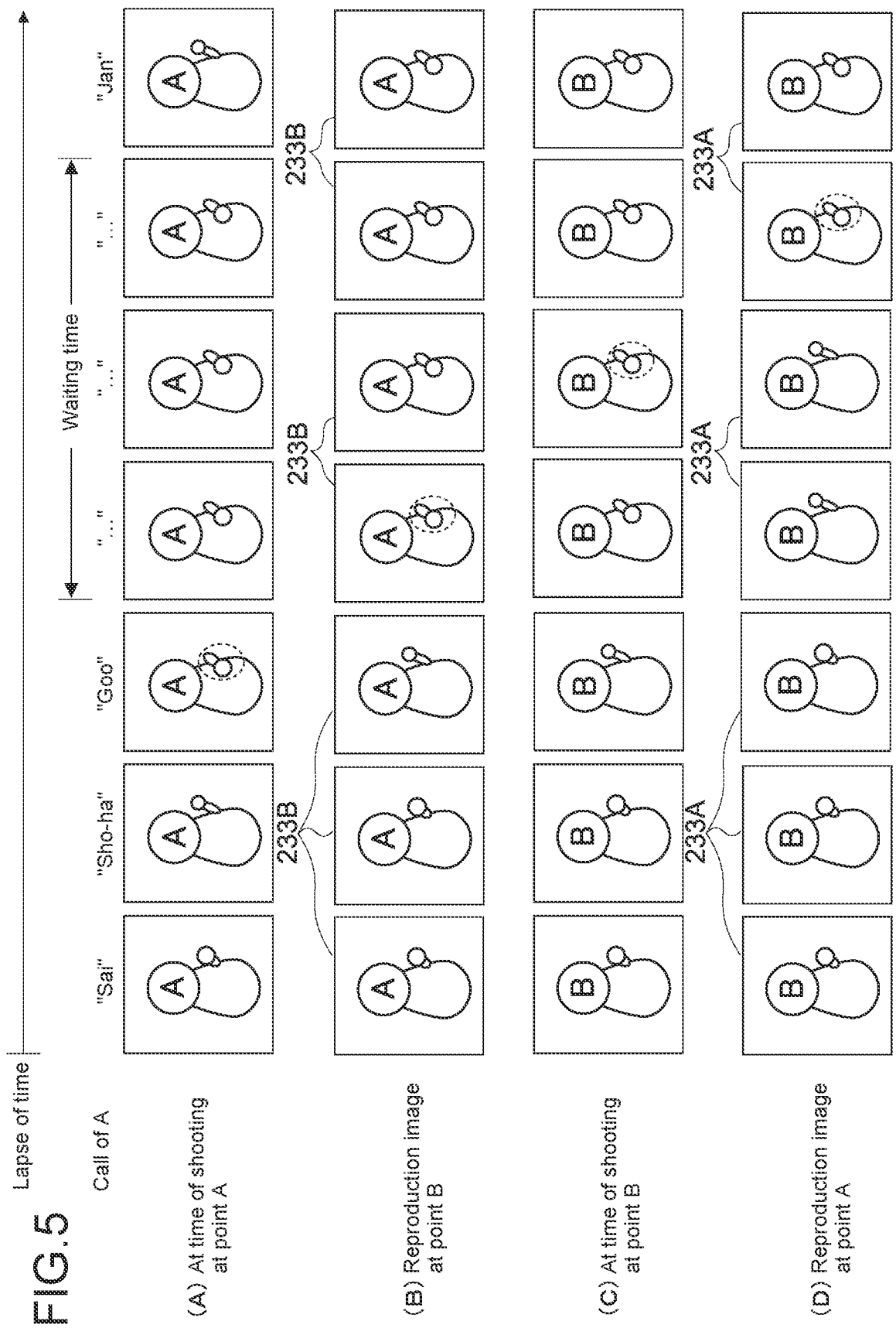

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2019/041998 (filed on Oct. 25, 2019) under 35 U.S.C. § 371, which claims priority to Japanese Patent Application No. 2018-208707 (filed on Nov. 6, 2018), which are all hereby incorporated by reference in their entirety.

TECHNICAL FIELD

The present technology relates to an information processing apparatus and an information processing method.

BACKGROUND ART

Video/voice data can be bi-directionally transmitted between different points using a communication network such as a video conference, and information can be exchanged in real time (for example, see Patent Literature 1).

According to Patent Literature 1, a low-delay priority of the video/voice data is determined on the basis of a conversation amount and a degree of lively conversation of the video conference.

CITATION LIST

Patent Literature

Patent Literature 1: Japanese Patent Application Laid-open No. 2009-76952

DISCLOSURE OF INVENTION

Technical Problem

In the technology described in Patent Literature 1, for example, in a situation where there is no conversation between users and video synchronization between two persons at different location points is required, it is difficult to provide an appropriate video to the user due to a delay of the video/voice data.

In view of the above circumstances, an object of the present technology is to provide an information processing apparatus and an information processing method capable of reducing a sense of delay given to a user.

Solution to Problem

In order to achieve the above object, an information processing apparatus according to an embodiment of the present technology includes an acquisition section; an encoding section; a context recognition section; a priority data extraction section; and a communication section.

The acquisition section acquires data relating to a transmission point.

The encoding section encodes the data relating to the transmission point.

The context recognition section sets data to be preferentially transmitted from the data relating to the transmission point on the basis of a situation of the transmission point recognized using the data relating to the transmission point.

The priority data extraction section extracts the preferentially transmitted data as priority data on the basis of a setting in the context recognition section.

The communication section transmits the data encoded by the encoding section and unencoded priority data to an information processing apparatus at a reception point.

According to such a configuration, data to be preferentially transmitted to the information processing apparatus at the reception point is extracted on the basis of the situation of the transmission point, and the data is transmitted to the information processing apparatus at the reception point without being encoded. As a result, the data to be preferentially transmitted does not require time for encoding processing, so it can be transmitted to the information processing apparatus at the reception point earlier than the data to be encoded.

The priority data extraction section may extract, as the priority data, the data to be preferentially transmitted, the situation of the transmission point, and a reproduction time of the data to be preferentially transmitted.

The apparatus may further include a storage section that stores the priority data and a priority data prediction section that predicts data to be preferentially transmitted on the basis of the priority data stored in the storage section.

The data relating to the transmission point may include video data.

The data relating to the transmission point may further include at least one of sound data or depth data.

In order to achieve the above object, an information processing apparatus according to an embodiment of the present technology includes a communication section; a decode section; a determination section; a reproduction data generation section; and an output section.

The communication section receives, from the information processing apparatus at the transmission point, data in which data relating to the transmission point is encoded and priority data that is extracted and unencoded from the data relating to the transmission point.

The decode section decodes the encoded data.

The determination section determines the reproduction time and a reproduction method of the unencoded priority data.

The reproduction data generation section generates reproduction data of the priority data on the basis of determination by the determination section.

The output section outputs the data decoded by the decode section and the reproduction data of the priority data.

With such a configuration, the unencoded priority data does not require decode processing, so that it can be reproduced faster than the encoded data.

The apparatus may further include a storage section that stores determination content in the determination section; a reproduction completion confirmation section that confirms whether or not there is data already reproduced by the reproduction data of the priority data among the decoded data with reference to the determination content stored in the storage section; and an interpolation data generation section that generates interpolation data for connecting the reproduction data of the priority data and the decoded data in a case where the reproduction data of the priority data is already reproduced by the reproduction completion confirmation section.

In order to achieve the above-mentioned purpose, an information processing method according to an embodiment of the present technology includes, by an information processing apparatus at a transmission point acquiring data relating to the transmission point,
encoding the data relating to the transmission point,
on the basis of a situation of the transmission point recognized using the data relating to the transmission point, extracting data to be preferentially transmitted as priority data from the data relating to the transmission point, and
transmitting the encoded data and the unencoded priority data to an information processing apparatus at a reception point,
by the information processing apparatus at the reception point
receiving the encoded data and the unencoded priority data,
decoding the encoded data,
determining a reproduction time and a reproduction method of the unencoded priority data,
generating the reproduction data of the priority data on the basis of the determination, and
outputting the decoded data and the reproduction data of the priority data.

BRIEF DESCRIPTION OF DRAWINGS

FIG. 5 is a diagram illustrating a specific example of a video delay in an information processing method according to a comparative example.

MODE(S) FOR CARRYING OUT THE INVENTION

An information processing apparatus according to an embodiment of the present disclosure and an information processing system using the same will be described. The information processing system relates to a communication system for bidirectionally transmitting video and voice data between two information processing apparatuses installed at different points each other.

In the information processing system of the present embodiment, a situation of each point where the information processing apparatus is installed (hereinafter, sometimes referred to as scene) is recognized by using sensing data such as video data and sound data relating to information of the point acquired by the information processing apparatus at the point.

The sensing data acquired by an information processing apparatus at a transmission point is encoded passing through an AV codec and transmitted to an information processing apparatus at a reception point.

Furthermore, in the information processing apparatus at the transmission point, data to be preferentially transmitted (hereinafter, sometimes referred to as priority data) to the information processing apparatus at the reception point is extracted from the sensing data depending on the scene. The extracted priority data is transmitted to the information processing apparatus at the reception point separately from the encoded data without passing through the AV codec.

In the information processing apparatus at the reception point, the encoded data and the unencoded priority data are reproduced.

Thus, in the information processing system according to the present embodiment, the priority data is transmitted separately without passing through the AV codec and is reproduced, so that a delay of the AV codec is eliminated and the priority data is quickly reproduced. In this manner, in the information processing apparatus at the reception point, video data or voice data with a reduced delay is received depending on the situation, and a sense of delay given to the user can be reduced.

This will be described below in detail.

(Configuration of Information Processing System)

Figure 1:
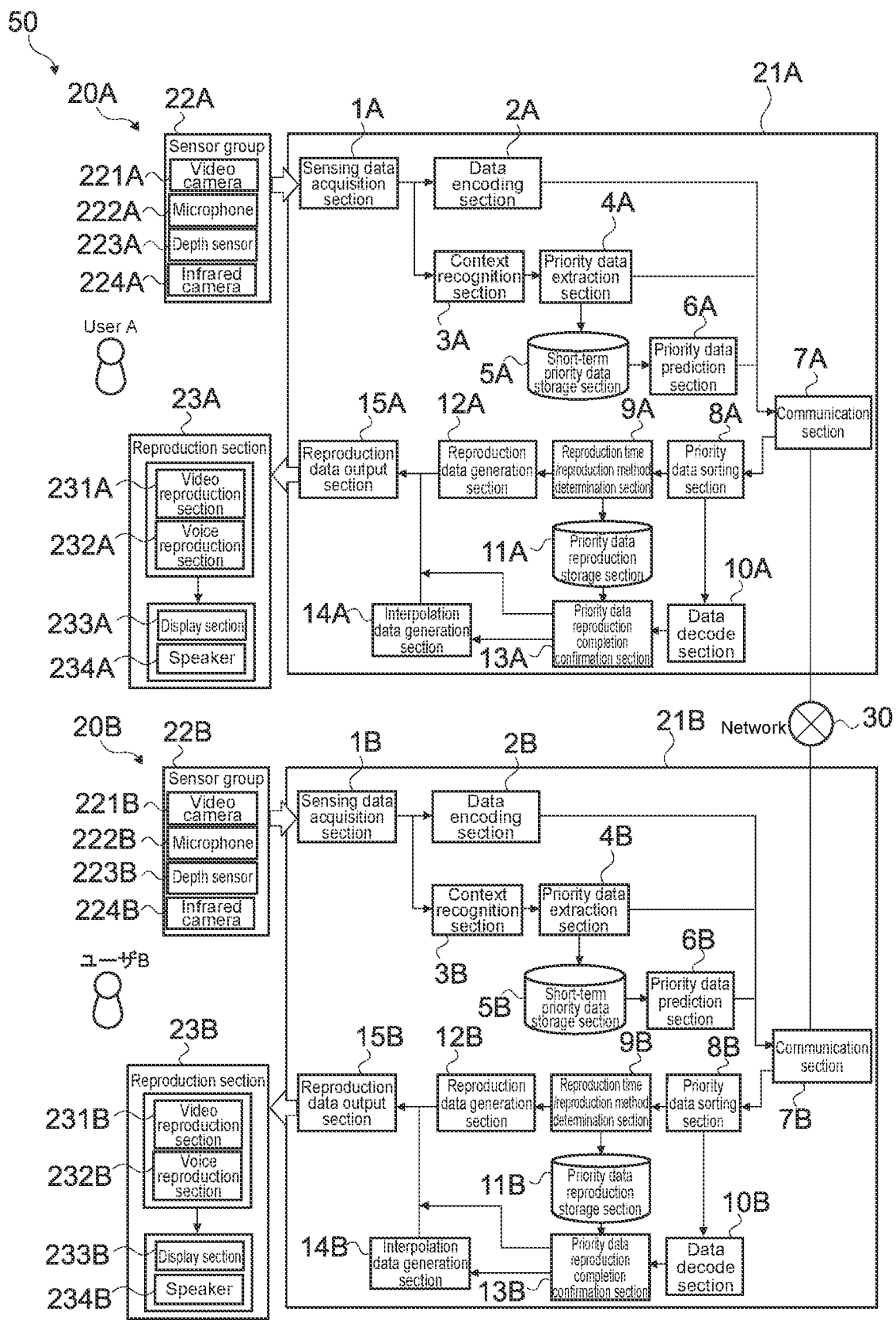
FIG. 1 is a diagram showing a configuration of an information processing system and an information processing apparatus in which an information processing apparatus according to an embodiment of the present technology is used.

FIG. 1 shows a configuration of an information processing system 50 according to the present embodiment.

As shown in FIG. 1, the information processing system 50 includes a first information processing system 20A and a second information processing system 20B. These two information processing systems 20A and 20B are capable of bidirectionally communicating via a network 30.

In the present embodiment, a user who uses the first information processing system 20A is assumed to be A, and a user who uses the second information processing system 20B is assumed to be B. The first information processing system 20A is installed at a point A where A is located. The second information processing system 20B is installed at a point B where B is located. The point A and the point B are located at different locations. When the point A is the transmission point, the point B is the reception point, and when the point B is the transmission point, the point A is the reception point.

The network 30 may include public networks such as the Internet, a telephone network, a satellite communications network, various LANs (Local Area Network) including the Ethernet (registered trademarks), WANs (Wide Area Network), and the like. The network 30 may also include a dedicated line network such as an IP-VPN (Internet Protocol-Virtual Private Network). The network 30 may include a radio communication network such as the Wi-Fi (registered trademark) and the Bluetooth (registered trademark).

The first information processing system 20A and the second information processing system 20B have the same configuration. Here, A is attached to an end of a sign to be added to each configuration of the first information processing system 20A, B is attached to an end of a sign unnecessary for each configuration of the second information processing system 20B, and the both are distinguished.

In the following description, when it is not necessary to separate the first information processing system 20A and the second information processing system 20B from each other, the attachment of A and B will be omitted.

The information processing system 20 includes an information processing apparatus 21, a sensor group 22, and a reproduction section 23. The configuration of the information processing apparatus 21 will be described later.

The sensor group 22 includes a video camera 221, a microphone 222 as a sound collecting section, a depth sensor 223, and various sensors such as an infrared camera 224. Sensing data acquired by various sensors includes information (data) relating to the point. Specifically, the data relating to the point is the video data, the sound data, the depth data, or the like of a person at the point or the surroundings of the person.

In the present embodiment, a situation (scene) of the point is recognized using the sensing data. Scene recognition is recognized using sensing data relating to at least any one of a plurality of points communicating with each other.

The scene recognition may be performed using the sensing data acquired at each of the plurality of points. The scene may be recognized between the two on the basis of the sensing data acquired at the information processing apparatus of a communication partner and the sensing data acquired by the information processing apparatus itself.

The video camera 221 acquires the video data of the point.

The microphone 222 collects a sound at the point, for example, a human voice or an environmental sound, and acquires the sound data.

The depth sensor 223 acquires depth data indicating a distance from the depth sensor of a person or an object at the point, for example, using infrared light. Any system such as a TOF (Time of Flight) system, a pattern-illumination system, and a stereo-camera system can be adopted for a system of the depth sensor.

The infrared camera 224 acquires infrared image data of the person, the object, or the like. A skeleton of the person can be estimated by the infrared image data.

The reproduction section 23 includes a video reproduction section 231, a voice reproduction section 232, a display section 233, and a speaker 234 as a voice output section.

The video reproduction section 231 performs reproduction processing such as a D/A conversion and amplification on the reproduction data based on priority data, predicted priority data, and non-priority data output and input from/to the reproduction data output section 15 of the information processing apparatus 21, which will be described later, and allows to display a video on the display section 233.

The voice reproduction section 232 performs reproduction processing such as the D/A conversion and the amplification on the reproduction data based on the priority data, the predicted priority data, and the non-priority data output and input from/to the reproduction data output section 15 of the information processing apparatus 21, which will be described later, and allows to output a voice from the speaker 234.

The priority data, the prediction priority data, and the non-priority data will be described later.

A reproduction time/reproduction method determination section 9 of the information processing apparatus 21, which will be described later, determines whether data reproduction processing is performed by the video reproduction section 231 or the voice reproduction section 232.

The display section 233 displays the video reproduced by the video reproduction section 231.

The display section 233 is constituted by a display device, e.g., a liquid crystal display, a plasma display, an OELD (Organic Electro Luminescence Display) or the like. The display section 233 is configured to be able to display a video of a communication partner point, a video of an own point, and both of the video of the communication partner point and the video of the own point.

For example, the video acquired by the second information processing system 20B is displayed on the display section 233A of the first information processing system 20A, and the video acquired by the first information processing system 20A is displayed on the display section 233B of the second information processing system 20B.

The speaker 234 outputs a sound reproduced by the sound reproduction section 232.

The sound acquired by the second information processing system 20B is output to the speaker 234A of the first information processing system 20A, and the sound acquired by the first information processing system 20A is output to the speaker 234B of the second information processing system 20B.

(Configuration of Information Processing Apparatus)

The information processing apparatus 21 includes a sensing data acquisition section 1, a data encoding section 2, a context recognition section 3, a priority data extraction section 4, a short-term priority data storage section 5, a priority data prediction section 6, a communication section 7, a priority data sorting section 8, a reproduction time/reproduction method determination section 9, a data decode section 10, a priority data reproduction storage section 11, a reproduction data generation section 12, a priority data reproduction completion confirmation section 13, an interpolation data generation section 14, and a reproduction data output section 15.

The sensing data acquisition section 1 serving as an acquisition section acquires the sensing data acquired by various sensors constituting the sensor group 22. The sensing data includes the video data, the sound data, the depth data, and the infrared image data. The sensing data is data relating to the point where the sensing data is acquired. Here, a case where the video data, the sound data, and the depth data are used as the sensing data will be described.

The sensing data acquired by the sensing data acquisition section 1 is output to the data encoding section 2 and the context recognition section 3.

In addition, the acquired sensing data is stored in a sensing data storage section (not shown) in chronological order.

The data encoding section 2 as an encoding section encodes the sensing data acquired by the sensing data acquisition section 1. All the data acquired by the sensing data acquisition section 1 (here, video data, sound data, and depth data) are encoded. The encoded data is output to the communication section 7. The encoded data is the non-priority data.

The data encoding section 2 and the data decode section 10, which will be described later, are provided in the AV codec (not shown).

The context recognition section 3 recognizes the situation (scene) of the point on the basis of the sensing data acquired by the sensing data acquisition section 1.

For example, the context recognition section 3 recognizes whether there are a plurality of persons at the point, whether conversation by persons is made, what the persons are doing, what the object is at the point, whether the object is moving or stationary, what is doing when the object is moving, and the like.

This recognition is performed by inputting and analyzing the sensing data to a corresponding analyzer.

Among the various types of sensing data, the sound data is discriminated by the analyzer into the human voice and an environmental sound by voice recognition. Thus, the sound data of the human voice can be extracted.

Furthermore, in the voice recognition, language recognition is carried out on the basis of the sound data, and the keyword is extracted by recognizing the words included in the sound data by a word unit. The extracted keywords include nouns representing a name of an object and the like, instruction words such as "stop", "go", and the like, and words representing emotions such as "happy", "pleasant", and the like. By using the extracted keywords, it is possible to recognize the situation (scene) of the point.

As a voice recognition method, for example, there is a method of accumulating a feature of voice from learning data, comparing the feature with a supplied voice, and extracting a keyword, and the like, and known methods can be used.

A difference between a pixel value of the video data among the various types of sensing data and a pixel value of a frame image previously acquired for each pixel is taken by the analyzer.

A difference between the depth data among the various types of sensing data and the depth data acquired previously is taken by the analyzer. On the basis thereof, a movement amount of the object in the depth direction and the longitudinal direction is determined.

For the previously acquired frame image and depth data, data stored in the sensing data storage section is used.

From the difference between the pixel values and the movement amount of the object, movement information about the person and the object can be acquired.

The scene is estimated and recognized on the basis of an analysis result of each sensing data.

Examples of the scene include a scene of performing a Janken, a scene of performing a video conference, a scene of performing a remote control, a scene of remotely pointing a finger, and the like that are performed between two persons (between two parties A and B in the present embodiment) placed in two different locations using communication between the information processing systems installed in a plurality of different locations (first information processing system 20A and second information processing system 20B in the present embodiment). Note that it is not limited to these scenes.

Furthermore, the context recognition section 3 sets an identification flag of the data to be synchronized between the two points and between the two parties on the basis of the recognized scene. The data to be synchronized between two points and between two parties is data to be preferentially transmitted to the information processing apparatus of the partner (information processing apparatus at transmission point), and is important information for smooth communication between the two parties in the scene. The identification flag is set so that it can identify whether or not the data is to be transmitted preferentially.

The data to be preferentially transmitted to the information processing apparatus of the communication partner is set depending on the scene. Specific examples will be described later.

Examples of the data to be synchronized (preferentially transmitted data) include the sound data such as the human voice determined by the analysis of the sound data, the pixel value determined by the analysis of the video data, and a moving amount of the object determined by the analysis of the depth data.

Specific examples will be described later.

A scene name recognized by the context recognition section 3, information of the identification flag set for the scene name, and the reproduction time of the data to be preferentially transmitted are output to the priority data extraction section 4.

On the basis of the set identification flag, the priority data extracting section 4 extracts the information to be synchronized between the two points and between the two parties, that is, the data to be preferentially transmitted. The priority data extracting section 4 combines and links the data to be preferentially transmitted, the scene name, the identification flag information, and the reproduction time with each other, and outputs as the priority data to the short-term priority data storage section 5 and the communication section 7.

The short-term priority data storage section 5 stores the priority data extracted by the priority data extraction section 4 in a short-term manner and in chronological order.

The priority data prediction section 6 predicts future priority data on the basis of the priority data stored in the short-term priority data storage section 5 and generates prediction priority data. The predicted priority data is output to the communication section 7.

More specifically, the priority data prediction section 6 determines whether or not the person or the object in the video performs a continuous action by a recognized scene name on the basis of time-series priority data stored in the short-term priority data storage section 5.

Furthermore, in a case where it is determined that the person or the object performs the continuous action, the priority data predicting section 6 determines whether or not a phase is capable of predicting the action of the person or the object from the time-series priority data stored by the short-term priority data storage section 5.

Then, if it is determined that the phase is predictable, the prediction priority data, which is the future priority data, is predicted and generated on the basis of the information stored in the short-term priority data storage section 5.

By providing the priority data prediction section in this manner, important data corresponding to the scene can be presented to the communication partner preferentially, and communication between the two parties can be made smoother.

As an example, in a scene of the Janken, information of a shown hand becomes important, and the pixel value of the video data of a portion of the shown hand becomes the priority data.

In the Janken, it can predict what form the shown hand will take from a shape change before a hand is fully presented with any of "Goo," "Choki," or "Paa". Therefore, it is possible to predict and generate the predicted priority data, which is the future priority data, on the basis of the time-series priority data stored by the short-term priority data storage section 5 before the shown hand is fully presented.

The prediction priority data includes predicted preferentially transmitted data such as the sound data, the pixel value, the moving amount of object, and the like, the scene name, the identification flag, and the reproduction time. The predicted priority data is transmitted to the information processing apparatus of the communication partner without being encoded.

The communication section 7 transmits and receives data to and from the information processing apparatus of the communication partner. In the present embodiment, the information processing apparatus of the communication partner in the first information processing apparatus 20A (second information processing apparatus 20B) is the second information processing apparatus 20B (first information processing apparatus 20A).

The communication section 7 transmits the priority data and the non-priority data acquired on the basis of the sensing data acquired by its own information processing apparatus to the information processing apparatus of the communication partner. Furthermore, the communication section 7 receives the priority data and the non-priority data acquired on the basis of on the sensing data acquired by the information processing apparatus of the communication partner.

In this way, the priority data is transmitted to the information processing apparatus of the communication partner without passing through the AV codec and without being encoded. Thus, as compared with the non-priority data encoded passing through the AV codec and transmitted to the information processing apparatus of the communication partner, a priority code does not require the time required for encoding, so there is no delay for the encoding by the AV codec, and it can be quickly transmitted to the information processing apparatus of the communication partner.

As a result, the video data and the voice data with the reduced delay can be transmitted to the information processing apparatus at the reception point, and smooth communication between the two parties becomes possible.

The priority data sorting section 8 sorts the data from the information processing apparatus of the communication partner received by the communication section 7 into the priority data or the prediction priority data and the non-priority data. The priority data and the predictive priority data are unencoded data. The non-priority data is the data being encoded.

The priority data sorting section 8 outputs the non-priority data to the data decode section 10.

The priority data sorting section 8 outputs the priority data and the prediction priority data to the reproduction time/reproduction method determination section 9.

The reproduction time/reproduction method determining section 9 as the determining section determines the reproduction time of the priority data (prediction priority data) sorted by the priority data sorting section 8, and which reproduction section reproduces the video data (prediction video data) or the sound data (prediction sound data) as the priority data (prediction priority data). The determination content is stored in the priority data reproduction storage section 11. The determination content is output to the reproduction data generation section 12.

The data decode section 10 as the decode section decodes the non-priority data sorted by the priority data sorting section 8. The decoded non-priority data is output to the priority data reproduction completion confirmation section 13.

The priority data reproduction storage section 11 as the storage section stores the content of the priority data, the reproduction time at which reproduction is performed using the priority data, and the information of the reproduction section used for reproduction, as the content determined by the reproduction time/reproduction method determination section 9.

The reproduction data generation section 12 generates the reproduction data of the priority data and the predicted priority data on the basis of the content determined by the reproduction time/reproduction method determination section 9. The generated reproduction data is output to the reproduction data output section 15.

Before reproducing the data decoded by the data decode section 10, the priority data reproduction completion confirmation section 13 as the reproduction completion confirmation section refers to the determined content stored in the priority data reproduction storage section 11 and confirms whether or not any of the data in which the non-priority data received from the information processing apparatus of the communication partner is decoded is already reproduced by the reproduction using the priority data.

The priority data reproduction completion confirmation section 13 outputs the decoded non-priority data that is not yet reproduced to the reproduction data output section 15. In addition, the priority data reproduction completion confirmation section 13 outputs the confirmation result to the interpolation data generation section 14.

The interpolation data generation section 14 generates interpolation data for interpolating and joining the decoded non-priority data and the priority data that is already reproduced using the priority data. The generated interpolation data is output to the reproduction data output section 15.

Thus, by providing the interpolation data generation section 14, it is possible to display the video with less discomfort in a flow of motion of a person to be projected on the image, and it is possible to output a sound with less discomfort in a flow of a voice of a person to be output.

The reproduction data output section 15 as the output section receives the input of the reproduction data from the reproduction data generation section 12, the input of the decoded data from the priority data reproduction completion confirmation section 13, and the input of the interpolation data from the interpolation data generation section 14, and outputs the reproduction data to the reproduction section 23.

In the information processing apparatus 21 at the reception point, since the priority data is not encoded, it is unnecessary to decode it passing through the AV codec, so there is no delay in decoding by the AV codec, and it can be reproduced earlier than the non-priority data.

As a result, the data transmitted from the information processing apparatus 21 at the transmission point can be reproduced with the reduced delay, thereby enabling smoother communication between the two parties.

(Information Processing Method)

Next, an information processing method executed by the information processing system 50 will be described with reference to FIG. 2 and FIG. 3 for each of a transmission side and a reception side.

Note that although the point A is the transmission point and the point B is the reception point for the sake of convenience, it is needless to say that the point A may be the reception point and the point B may be the transmission point, and the same processing is performed in such a case. Hereinafter, the configuration shown in FIG. 1 will be described as necessary.

[Action Flow in Information Processing System at Transmission Point]

Figure 2:
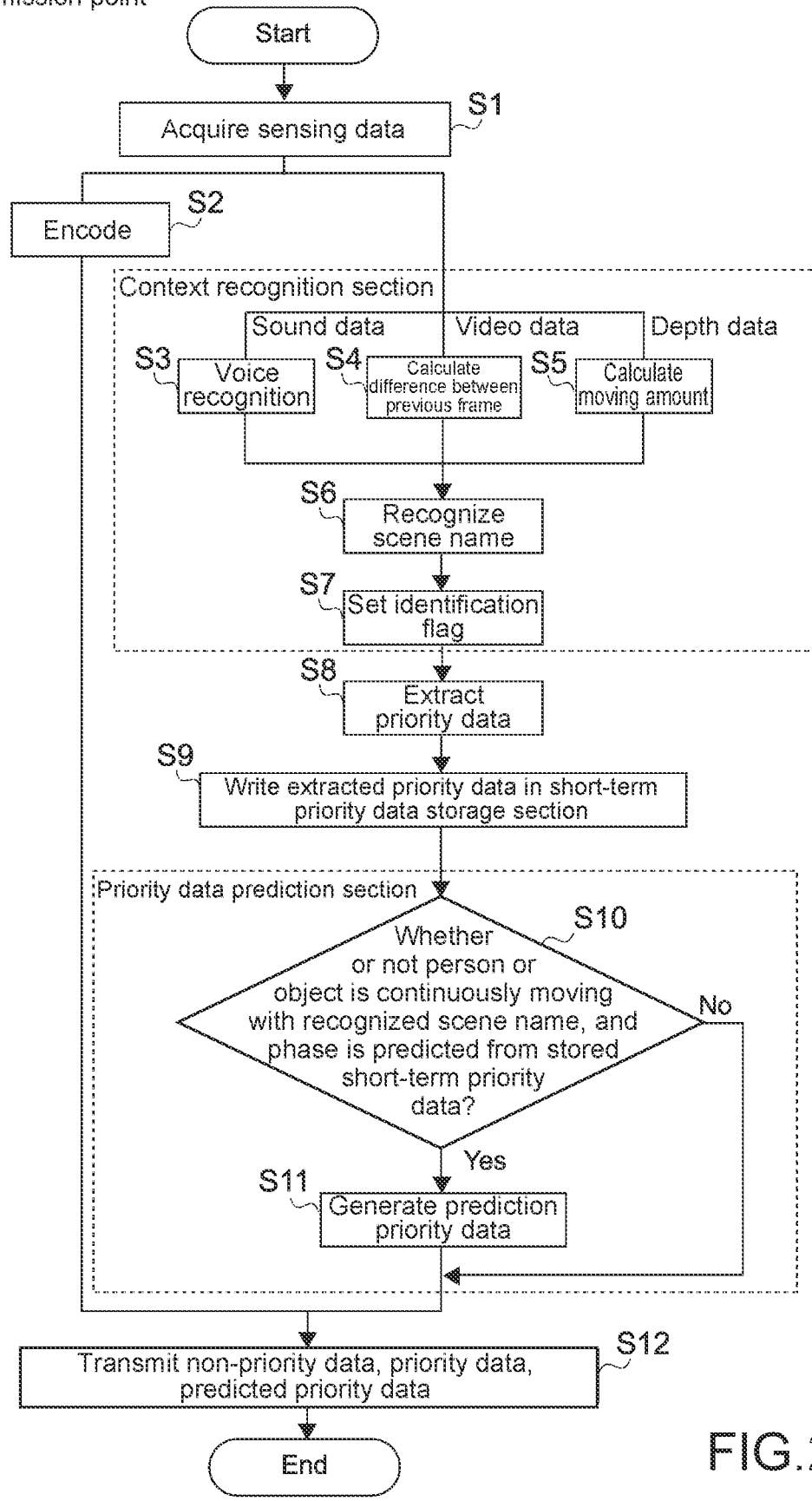
FIG. 2 is a flowchart of the information processing method relating to a delay control in the information processing apparatus at a transmission point.

FIG. 2 is a flowchart of an information processing method according to the delay control in the information processing system (here, first information processing system 20A) on the transmission side. Hereinafter, the information processing method in the information processing system on the transmission side will be described with reference to FIG. 2.

As shown in FIG. 2, the sensing data acquisition section 1A of the first information processing apparatus 21A acquires the sensing data acquired by the various sensors of the sensor group 22A as the data relating to the point A (S1). In the present embodiment, the sensing data includes the sound data, the video data, and the depth data.

The sensing data (sound data, video data, depth data) acquired by the sensing data acquisition section 1A is synchronized with the sensing data acquisition time by the data encoding section 2A, and is encoded by general-purpose codec processing (S2).

In the codec processing, codec processing with a short processing time is performed for the sound data, the video data, and the depth data. For example, the voice data and the video data are encoded in a VP9 with the short processing time for the real-time communication.

The encoded data, that is, the non-priority data is transmitted to the second information processing apparatus 21B via the communication section 7A (S12).

The context recognition section 3A performs the voice recognition of the acquired sound data (S3). In the voice recognition, the human voice and the environmental sound are discriminated.

The context recognition section 3A acquires the pixel value using the acquired video data, and calculates the difference between the pixel values thereof and the previous frame for each pixel (S4).

The context recognition section 3A takes the difference between the acquired depth data and depth information of the previous frame, and determines the moving amounts of the objects in the depth direction and the vertical direction (S5).

The motion information of the person or the object can be acquired from the difference result of these pixel values and the movement amount of the object.

The context recognition section 3A recognizes the scene on the basis of the voice recognition result, the difference result of the pixel values, and the moving distance result of the object (S6).

Next, the context recognition section 3A sets the identification flag for the data to be preferentially transmitted on the basis of the recognized scene so that the data can be identified (S7).

Next, the priority data extraction section 4A extracts the data to be preferentially transmitted to the second information processing apparatus 21B from the sound data, the pixel value, the moving amount of the object, and the like, on the basis of the set identification flag. The extracted data is extracted as the priority data together with the scene name, the identification flag information, and the reproduction time (S8).

Next, the extracted priority data is written and stored in the short-term priority data storage section 5A (S9).

Next, on the basis of the time-series priority data stored by the short-term priority data storage section 5, the priority data prediction section 6 determines whether or not the person or the object is continuously moving with the recognized scene name and the phase is capable of predicting the action of the person or the object from the time-series priority data stored by the short-term priority data storage section 5 (S10).

If it is determined No in S10, it proceeds to S12. The priority data is transmitted to the second information processing apparatus 21B via the communication section 7A (S12).

If it is determined in S10 that the person or the object is continuously moving and the phase is capable of predicting the action of the person or the object (Yes), it proceeds to S11.

In S11, the prediction priority data is generated on the basis of the information stored in the short-term priority data storage section 5. The generated prediction priority data and the priority data are transmitted to the second information processing apparatus 21B via the communication section 7A (S12).

[Action Flow in Information Processing System at Reception Point]

Figure 3:
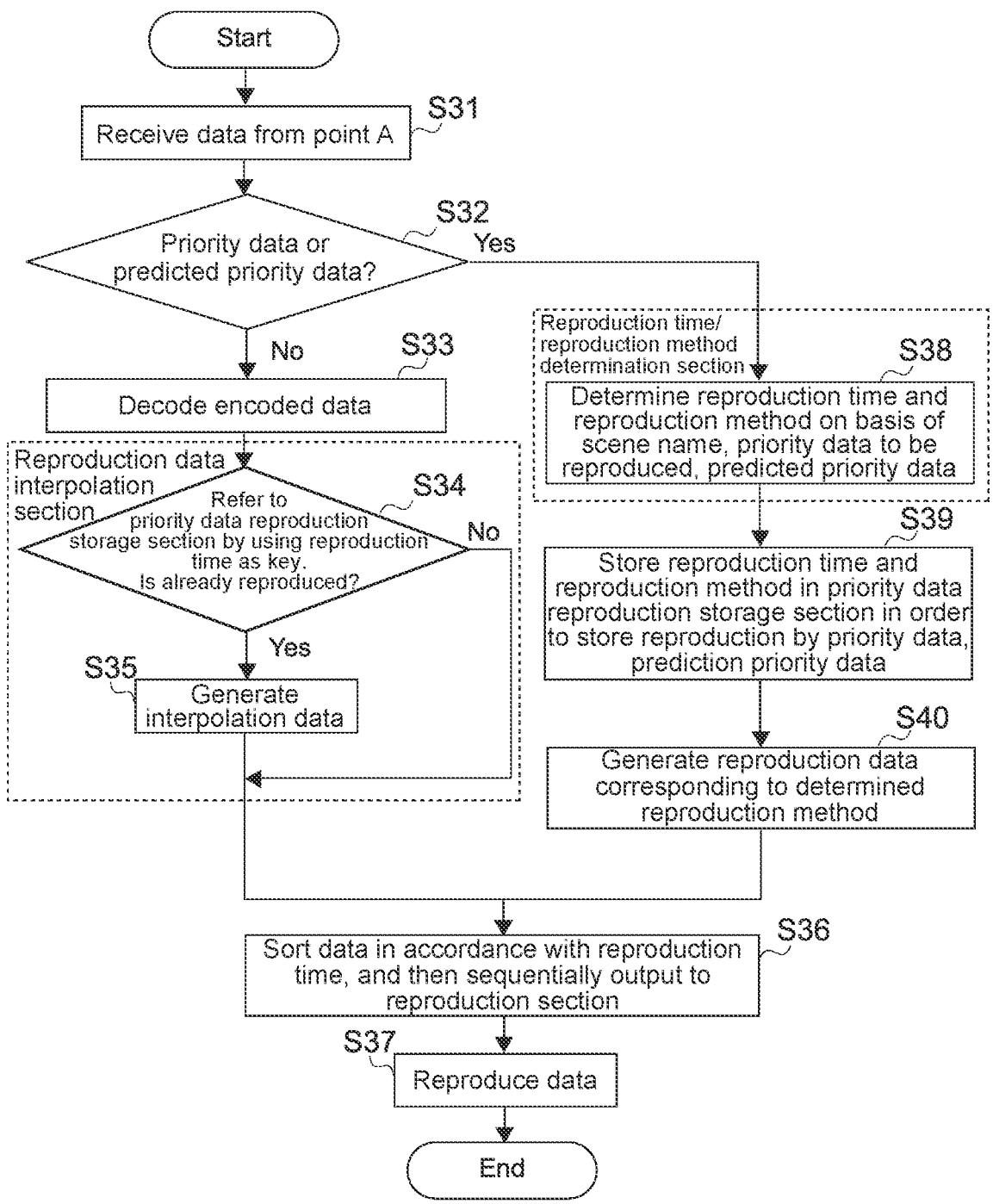
FIG. 3 is a flowchart of an information processing method relating to a delay control in an information processing apparatus at a reception point.

FIG. 3 is a flowchart of an information processing method relating to the delay control in the information processing system on the reception side (here, second information processing system 20B). Hereinafter, the information processing method in the information processing system on the reception side will be described with reference to FIG. 3.

As shown in FIG. 3, the priority data, the non-priority data, and the prediction priority data are received from the first information processing apparatus 21A via the network 30 by the communication section 7B of the second information processing apparatus 21B (S31).

Next, the priority data sorting section 8B determines whether or not the received data is the priority data or the prediction priority data (S32).

If it is determined in S32 that the data is not the priority data or the prediction priority data, that is, it is the non-priority data (No), it proceeds to S33.

If it is determined in S32 that the data is the priority data or the predicted priority data (Yes), it proceeds to S38.

In S38, the reproduction time/reproduction method determination section 9 determines the reproduction time and the reproduction method of the priority data or the predicted priority data to be reproduced. The reproduction method indicates which reproduction section is used for reproduction.

The reproduction time and the reproduction method are stored in the priority data reproduction storage section 11B, and reproduction information of the priority data or the prediction priority data is stored (S39).

Next, the reproduction data generation section 12B generates the reproduction data using the priority data or the predicted priority data in accordance with the determined reproduction method (S40). The generated reproduction data is output to the reproduction data output section 15B, and it proceeds to S36.

In S33, the data decode section 10B decodes the non-priority data that is the encoded data.

Next, the priority data reproduction completion confirmation section 13B refers to the data stored in the priority data reproduction storage section 11B, uses the reproduction time as a key, and confirms whether or not the content included in the decoded data is already reproduced by reproduction using the priority data (S34).

If it is determined in S34 that the data is not reproduced, the decoded data is output to the reproduction data output section 15B, and it proceeds to S36.

If it is confirmed in S34 that the data is reproduced (Yes), the interpolation data generation section 14B generates the interpolation data such that the reproduction by the priority data performed in advance and the reproduction by the decoded data are successfully connected (S35). The generated interpolation data is output to the reproduction data output section 15B, and it proceeds to S36.

In S36, the reproduction data output section 15B sorts the data in accordance with the reproduction time of the data, and then sequentially outputs the data to the determined reproduction section (video reproduction section 231B or voice reproduction section 232B). The preferentially separated priority data is superimposed on the non-priority data being decoded in accordance with the determined reproduction time, and is output as output data.

As a specific example, in the case of the scene of the Janken, data is output, the data being acquired by superimposing the video data of the portion of the shown hand, which is the priority data, on the hand portion of the video data being decoded.

The video reproduction section 231B and the voice reproduction section 232B perform the reproduction processing on the basis of the input data (S37), the video is displayed on the display section 233B, and the voice is output from the speaker 234B.

In the case of the scene of the Janken, a video is displayed on the display section 233B, the video being acquired by superimposing the video data of the portion of the shown hand, which is the priority data, on the hand portion of the decoded video data.

(Specific Example of Information Processing Method for Delay Control)

Next, as an example of the information processing method relating to the delay control, a case of which a scene in which A and B at different points perform the Janken is recognized will be described with reference to FIG. 4 and FIG. 5.

The "Janken" is a game that uses only hands. The Janken is a means of determining winning and losing by constructing three deadlock with three types of fingers. For example, in English-speaking countries, the "Janken" is called Rock-paper-scissors.

In Japan, there are three types of fingers, generally, "Goo" in which all five fingers are gripped to take the form of a fist, and "Choki" in which the index and middle fingers are extended and the other fingers take the form of gripping, and "Par" in which all five fingers are extended.

The "Goo" corresponds to Rock of the Rock-paper-scissors. The "Choki" corresponds to scissors of the Rock-paper-scissors. The "Par" corresponds to paper of the Rock-paper-scissors.

In the "Janken", the "Goo" wins the "Choki" but loses the "Par", the "Choki" wins the "Par" but loses the "Goo", the "Par" wins the "Goo" and the "Par" wins the "Goo" but loses the "Choki".

In Japan, a standard phrase "Saisho-ha Goo, Janken pon" is often used as a call when performing the Janken. Here, an information processing method relating to the delay control will be described by taking an example of a case in which the call is used.

In the Janken using the call of the "Saisho-ha Goo, Janken pon", as a rule of the Janken, at the same time that the voice of the "Goo" of the "Saisho-ha Goo" is uttered, all the Janken players are supposed to show a hand form of "Goo".

Then, following the "Saisho-ha Goo", the voice of "Janken pon" is uttered and the voice of "Pon" of the "Janken pon" is uttered, and at the same time, all the Janken players show the hand forms of any of "Goo", "Choki" or "Par" in order to decide winning or losing.

Figure 4:
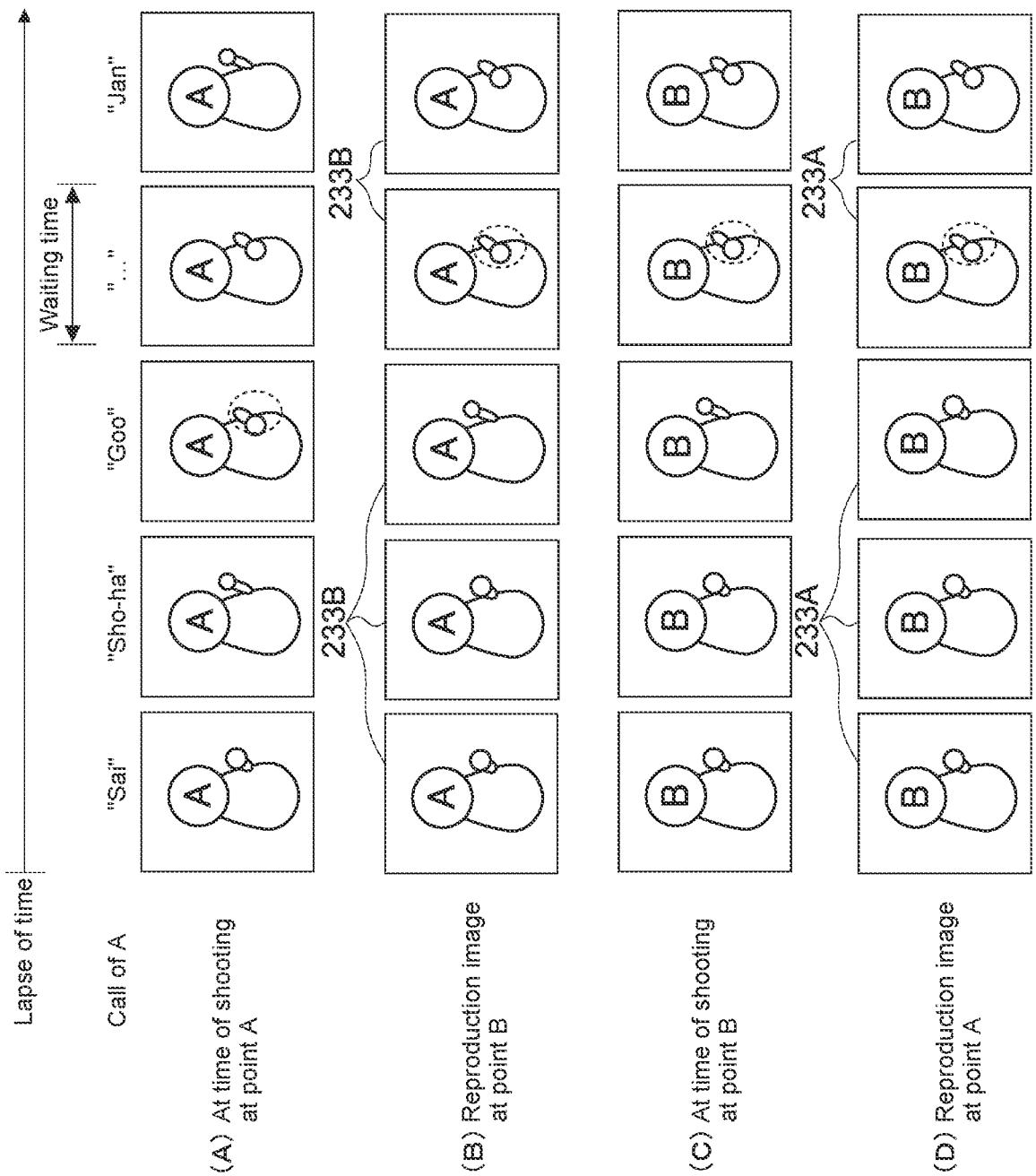
FIG. 4 is a diagram illustrating a specific example of the delay control in the information processing method according to the embodiment of the present technology.

FIG. 4 is a diagram illustrating a specific example of an information processing method relating to the delay control in the information processing method according to an embodiment of the present technology. The example shown in FIG. 4 illustrates the case where there is the unencoded priority data that is preferentially transmitted.

FIG. 5 is a diagram illustrating a specific example of an information processing method relating to the delay control in the information processing method according to a comparative example. The example shown in FIG. 5 shows a case in which there is no priority data to be preferentially transmitted and data to be transmitted to the information processing apparatus of the communication partner is only the non-priority data that is the encoded data.

In the examples shown in FIGS. 4 and 5, it assumes that A utters the call and A and B show the hand forms of any of Goo, Choki, or Par in response to the utterance and according to the actions of each other.

First, the comparative example will be described with reference to FIG. 5.

FIGS. 5(A) to (D) show changes with time of each user at the time of shooting or the reproduced videos in a plurality of frames, respectively. In FIG. 5, the shown hand in the first frame at the time of showing "Goo" is surrounded by an ellipse of a chain line.

FIG. 5(A) shows the change with time of the action of A when A is shot by the first information processing system 20A. The video data, the voice data, and the depth data of A acquired by the first information processing system 20A are encoded and transmitted to the second information processing system 20B.

In the second information processing system 20B, the data transmitted from the first information processing system 20A is decoded, and the video and the voice are reproduced.

FIG. 5(B) shows the change with time of the reproduced video displayed on the display section 233B of the second information processing system 20B on the basis of the data transmitted from the first information processing system 20A. The reproduced video is the video at the point A.

As shown in FIGS. 5(A) and (B), due to a transmission delay, the video is reproduced at a second information processing system 20B side slightly delayed than at the time of shooting by the first information processing system 20A. In the example shown in the figures, the timing at which "Goo" is shown in the reproduced video displayed by the second information processing system 20B is delayed by one frame in time than when shooting by the first information processing system 20A.

As shown in FIG. 5(B), B who is the user on the second information processing system 20B side, looks the reproduced video and performs the Janken.

FIG. 5(C) shows the change with time of the action of B when the second information processing system 20B is shooting B who performs the Janken by looking the reproduced video as shown in FIG. 5(B).

B looks at the reproduced video shown in FIG. 5(B), and shows "Goo" as shown in FIG. 5(C) at the timing of showing "Goo" when the "Goo" of the "Saisho-ha Goo" by A. As shown in FIGS. 5(A) and 5(C), the timing at which A shows "Goo" and the timing at which B shows "Goo" are out of synchronization.

The video data, the voice data, and the depth data of B acquired by the second information processing system 20B are encoded and transmitted to the first information processing system 20A.

In the first information processing system 20A, the data transmitted from the second information processing system 20B is decoded, and the video and the voice are reproduced.

FIG. 5(D) shows the change with time of the reproduced video displayed on the display section 233A of the first information processing system 20A on the basis of the data transmitted from the second information processing system 20B.

As shown in FIGS. 5(C) and (D), the video of the point B is reproduced on the display section 233A of the first information processing system 20A with a delay from the time of shooting by the second information processing system 20B due to the transmission delay. In the example shown in the figures, the timing at which "Goo" is shown in the video of a state of the point B reproduced and displayed on the display section 233A of the point A is delayed by three frames in terms of time from the time of shooting at the first information processing system 20A side (see FIG. 5(A)).

A who is the user of the first information processing system 20A side performs the Janken by looking at the reproduced video shown in FIG. 5(D).

In other words, A confirms the video of the hand form of Goo shown in response to "Goo" of the call by B, "Saisho-ha Goo" on the display section 233A, and then utters the next call the "Janken pon."

Thus, as shown in FIG. 5(A), a waiting time of three frames will occur for A from the voice of "Saisho-ha Goo" to the next voice of the "Janken pon."

On the other hand, in the information processing method in which the delay control shown in FIG. 4 is executed according to the present embodiment, as shown in FIG. 4(A), the waiting time of A is one frame, and the waiting time is shorter as compared with the comparative example.

Hereinafter, the description is made using FIG. 4. FIGS. 4(A) to (D) show the changes with time of each user at the time of shooting or the reproduced videos in a plurality of frames, respectively. In FIG. 4, the shown hand in the first frame at the time of showing "Goo" is surrounded by an ellipse of a chain line.

In the example described here, it is assumed that the scene, which is a situation of the user, is already recognized by the information processing apparatus 21 as the scene in which the user performs the Janken on the basis of the sensing data acquired by the sensing data acquisition section 1.

In the information processing apparatus 21, the identification flag is set in the data so that data (priority data) to be preferentially transmitted to the partner information processing apparatus can be identified on the basis of the recognized scene. In the scene of the Janken, the identification flag is set so that the video data of the portion of shown hand in the form of "Goo", "Choke" or "Par" in the video data becomes the priority data.

The video data, the sound data, and the depth data, which are the sensing data, are encoded and transmitted as the non-priority data.

In addition to the encoded data (non-priority data), in the scene of the Janken, the pixel value of the video data of the portion of the shown hand is transmitted to the information processing apparatus of the communication partner without being encoded as the priority data. In other words, in the scene of the Janken, the video information of the shown hand is important, and therefore the video data of the shown hand becomes the preferred data. The priority data corresponds to information that, if delayed, would result in poor communication in terms of the Janken between A and B.

In the information processing system 50, the priority data is output to the reproduction data output section of the information processing apparatus of the communication partner without being encoded and decoded, so that there is no delay in encoding and decoding by the AV codec, and it becomes possible to present to the communication partner earlier than the non-priority data.

In the present embodiment, the case where it is recognized that the scene is the Janken is taken as an example, and therefore, the video data (pixel value) of the portion of the shown hand of a Janken player is preferentially transmitted separately. Then, according to the determined reproduction time, the output data is generated by superimposing the video of the portion of the shown hand preferentially transmitted separately on the video data that is encoded, transmitted and decoded.

The example shown in FIG. 4 shows the case where the delay control according to the present technology is executed when the video of B is transmitted to A in order to make the effect of the present technology easy to understand.

FIG. 4(A) shows the change with time of the action of A when A is shot by the first information processing system 20A. The video data, the sound data, and the depth data acquired by the first information processing system 20A are encoded and transmitted to the second information processing system 20B.

In the second information processing system 20B, the video and the voice are reproduced on the basis of the data transmitted from the first information processing system 20A.

FIG. 4(B) shows the change with time of the reproduced video displayed on the display section 233B.

As shown in FIGS. 4(A) and (B), due to the transmission delay, the video is reproduced at the second information processing system 20B side slightly delayed than at the time of shooting by the first information processing system 20A. In the example shown in the figures, the timing at which "Goo" is shown in the reproduced video displayed at the second information processing system 20B side is delayed by one frame in time than when shooting by the first information processing system 20A.

As shown in FIG. 4(B), B who is the user on the second information processing system 20B side, looks the reproduced video and performs the Janken.

FIG. 4(C) shows the change with time of the action of B when the second information processing system 20B is shooting B who performs the Janken by looking the reproduced video as shown in FIG. 4(B).

B looks at the reproduced video shown in FIG. 4(B), and shows "Goo" as shown in FIG. 4(C) at the timing of showing "Goo" when the "Goo" of the "Saisho-ha Goo" by A. As shown in FIGS. 4(A) and 4(C), the timing at which A shows "Goo" and the timing at which B shows "Goo" are out of synchronization.

The video data, the voice data, and the depth data of B acquired by the second information processing system 20B are encoded and transmitted to the first information processing system 20A.

Here, since it is already recognized that it is the scene of the Janken, the identification flag is set so that the pixel value of a partial video of the portion of the shown hand becomes the priority data.

In the second information processing system 20B, on the basis of the identification flag, partial video data (pixel value) of the portion of the shown hand of B is extracted as the priority data from the video data. The extracted priority data is not encoded but preferentially transmitted to the first information processing system 20A as the priority data.

In addition, in a case where there is the predicted priority data predicted by the priority data prediction section 6B, the predicted priority data is also preferentially transmitted to the first information processing system 20A without being encoded. Here, the prediction priority data is partial video data (pixel value) of a predicted portion of the shown hand.

In the first information processing system 20A, the reproduction time and the reproduction method of the video data (pixel value) of the shown hand, which is the priority data or the prediction priority data transmitted from the second information processing system 20B, are determined, and the reproduction data of the video data of the shown hand, which is the priority data, is generated on the basis thereof.

Furthermore, even in a case where there is the prediction priority data, the reproduction time and the reproduction method of the predicted video data of the shown hand, which is the predicted priority data transmitted, are determined, and on the basis of this, the reproduction data of the predicted video data of the shown hand, which is the predicted priority data, is generated.

Furthermore, in the first information processing system 20A, the encoded data that is the non-priority data transmitted from the second information processing system 20B is decoded.

In a case where there is data that is already reproduced using the priority data or the prediction priority data among the decoded data, the interpolation data is generated such that reproduction by the priority data or the prediction priority data performed in advance and reproduction by the decoded data are successfully connected.

The decoded data, the generated reproduction data, and the interpolation data are sorted in accordance with the reproduction time of the data, are then output to the video reproduction section 231A and the voice reproduction section 232A, and are reproduced. As a result, the reproduced video is displayed on the display section 233A as shown in FIG. 4(D).

FIG. 4(D) shows the reproduced video at the point B displayed on the display section 233A.

As shown in FIG. 4D, the "Goo" of the shown hand surrounded by an ellipse of a chain line is based on the video data (pixel value) of the shown hand preferentially transmitted as the priority data, and the video portions other than the shown hand is the video based on the non-priority data. Thus, the video of the shown hand based on the priority data preferentially transmitted is displayed superimposed on the video based on the non-priority data transmitted first.

As a result, the video of the shown hand important to the scene of the Janken is reproduced by the information processing apparatus of the communication partner while the delay is suppressed.

A who is the user of the first information processing system 20A side performs the Janken by looking at the reproduced video shown in FIG. 4(D). In other words, A confirms the video of the hand form of Goo shown in response to "Goo" of the call by B, "Saisho-ha Goo" on the display section 233A, and then utters the next call the "Janken pon."

Thus, as shown in FIG. 4(A), a waiting time of A is one frame from the voice of "Saisho-ha Goo" to the next voice of the "Janken pon." That is, as compared with the comparative example described using FIG. 5, the waiting time for information from B to A is shorter.

By reducing the waiting time in this manner, efficiency per unit time is improved. In addition, since the waiting time is shortened, a sense of delay felt by the user is reduced, and the communication between A and B can be made more natural and smoother.

As described above, in the present technology, since important data corresponding to the scene is extracted and preferentially transmitted to the information processing apparatus of the communication partner in communication between a plurality of points at a distant, important information can be presented to the communication partner while suppressing the delay.

Thus, for example, even in a communication situation in which the transmission delay is likely to increase, such as communication in an area where a communication infrastructure is not established or in a wide country, communication between other countries, important information corresponding to the scene can be presented to the communication partner more quickly, and the sense of delay in communication given to the user can be reduced.

Furthermore, the present technology can be applied to edging computing in which an IoT (Internet of Things) terminal that automatically transmits information etc. acquired by a sensor to a server is used, and data distribution processing is performed by a plurality of servers (edge servers) provided at a position physically close to the IoT terminal.

(Application Example of Information Processing Method for Delay Control in Other Scenes)

In the embodiments described above, the scene of Janken is described as an example, but it is not limited thereto. Depending on the recognized scene, the content of the data to be preferentially transmitted to the information processing system of the communication partner is changed, and important information corresponding to the scene is preferentially transmitted, thereby reducing the sense of delay that the user feels in the communication.

Hereinafter, an application example to scenes other than the Janken will be described, but it is not limited to these scenes.

For example, in the case of the scene of performing the video conference, since a mouth movement and a voice of a person who is likely to start speaking become important, video data of a portion of the mouth of the person who is likely to start speaking and data of the voice of the person are extracted from the sensing data as the priority data.

By preferentially transmitting such data to the information processing apparatus of the transmission partner, it is possible to prevent a start of speaking of respective users at different points from colliding in the video conference. This allows smoother communication between multiple different points, and also reduces the sense of delay in communication given to the user.

In addition, as another example, the present technology is also applicable to a remote control scene in which a person at the point A performs a moving operation of an object at the point B by, for example, a robot hand while listening to an instruction by a voice of a person at the point B.

In the case of such a remote control scene, an instruction by a voice such as "stop" (data of instruction voice) or video data of a robot hand which is an object approaching a moving operation target object is extracted as the priority data.

In an example in which the person at the point A performs the moving operation of the object at the point B while listening to the instruction of the person at the point B, if the point B is the transmission point, the data of the voice of the instruction uttered by the person at the point B is extracted from the acquired sound data at the point B. Furthermore, the video data of a portion of the robot hand is extracted from the acquired video data at the point B.

The extracted voice data of the instruction and the video data (pixel value) of the portion of the robot hand are preferentially transmitted as the priority data to the information processing apparatus at the point A serving as the reception side.

Furthermore, as another example of the scene of the remote control, in an example in which the moving operation of the object at the point A is performed by using the robot hand while the person at the point A listens to the instruction of the person at the point B, the data of the instruction voice uttered by the person at the point B is extracted from the sound data acquired at the point B when the point B is the transmission point. The data of the instruction voice is preferentially transmitted as the priority data to the information processing apparatus at the point A serving as the reception point.

On the other hand, when the point A is the transmission point, the video data of the portion of the robot hand is extracted from the video data acquired at the point A. The video data of the portion of the robot hand is preferentially transmitted as the priority data to the information processing apparatus at the point B serving as the reception point.

As described above, by preferentially transmitting the data of the instruction voice which is important in the remote control scene and the video data of the portion of the robot hand to the information processing apparatus of the communication partner, it is possible to perform a smoother remote control which can reduce the sense of delay in communication given to the user.

As still another example, the present technology is applicable to a remote pointing scene.

The remote pointing scene refers to, for example, a scene in which images of both of the point A and the point B are displayed on the display section 233A of the point A and the display section 233B of the point B, respectively, and a person at the point A points an object displayed on the image of the point B displayed on the display section 233A. In this case, in the video of the point B displayed on the display section 233B, the point pointed at the point A is displayed in the form of the pointing point.

In the case of the remote pointing scene, since the movement of the finger on the video becomes important, the video data (pixel value) of the portion of the finger pointing is extracted from the video data acquired at the point A, and is preferentially transmitted to the information processing apparatus at the point B as the priority data.

Thus, by preferentially transmitting the video data of the finger portion, a finger pointing direction of the transmission side and the finger pointing point displayed on the reception side are synchronized, and the sense of delay in communication given to the user can be reduced.

Embodiments of the present technology are not limited to the above-mentioned embodiments, and various modifications can be made without departing from the gist of the present technology.

For example, although the communication between two points is exemplified in the above embodiment, it is also applicable to communication between a plurality of three or more points.

In the above-described embodiment, the sound data, the video data, and the depth data are exemplified as the sensing data to be acquired, but the sensing data may be at least the video data. By partially extracting data from the video data depending on the scene and preferentially transmitting it to the information processing apparatus of the communication partner, it is possible to reduce the sense of delay in communication given to the user.

It should be noted that the present technology may take the following configurations.

REFERENCE SIGNS LIST

1A, 1B sensing data acquisition section (acquisition section)
2A, 2B data encoding section (encoding section)
3A, 3B context recognition section
4A, 4B priority data extraction section
6A, 6B priority data prediction section
7A, 7B communication section
9A, 9B reproduction time/reproduction method determination section (determination section)
10A, 10B data decode section (decode section)
11A, 11B priority data reproduction storage section (storage section)
12A, 12B reproduction data generation section
13A, 13B priority data reproduction completion confirmation section (reproduction confirmation section)
14A, 14B interpolation data generation section
15A, 15B reproduction data output section (output section)
20A first information processing apparatus (information processing apparatus at transmission point, information processing apparatus at reception point)
20B second information processing apparatus (information processing apparatus at transmission point and information processing apparatus at reception point)
50 information processing system

The invention claimed is:

1. An information processing apparatus, comprising:
   an acquisition section configured to acquire data relating to a transmission point;
   an encoding section configured to encode the data relating to the transmission point;
   a context recognition section configured to set data to be preferentially transmitted from the data relating to the transmission point on a basis of a situation of the transmission point recognized using the data relating to the transmission point;
   a priority data extraction section configured to extract the preferentially transmitted data from the data related to the transmission point as unencoded priority data on a basis of a setting in the context recognition section; and
   a communication section configured to transmit the data encoded by the encoding section and the extracted unencoded priority data not encoded by the encoding section to an information processing apparatus at a reception point,
   wherein the acquisition section, the encoding section, the context recognition section, the priority data extraction section, and the communication section are each implemented via at least one processor.

2. The information processing apparatus according to claim 1, wherein
   the priority data extraction section is further configured to extract, as the unencoded priority data, the data to be preferentially transmitted, the situation of the transmission point, and a reproduction time of the data to be preferentially transmitted.

3. The information processing apparatus according to claim 2, further comprising:
   a storage section configured to store the priority data; and
   a priority data prediction section configured to predict data to be preferentially transmitted on a basis of the priority data stored in the storage section,
   wherein the storage section and the priority data prediction section are each implemented via at least one processor.

4. The information processing apparatus according to claim 3, wherein
   the data relating to the transmission point includes video data.

5. The information processing apparatus according to claim 4, wherein
   the data relating to the transmission point further includes at least one of sound data or depth data.

6. An information processing apparatus, comprising:
   a communication section configured to receive, from an information processing apparatus at a transmission point, data in which data relating to the transmission point is encoded and priority data that is extracted and unencoded from data relating to the transmission point;
   a decode section configured to decode the encoded data;
   a determination section configured to determine a reproduction time and a reproduction method of the unencoded priority data;

a reproduction data generation section configured to generate reproduction data of the priority data on a basis of determination by the determination section; and an output section configured to output the data decoded by the decode section and the reproduction data of the priority data, wherein the communication section, the decode section, the determination section, the reproduction data generation section, and the output section are each implemented via at least one processor.

7. The information processing apparatus according to claim 6, further comprising:

a storage section configured to store determination content in the determination section;

a reproduction completion confirmation section configured to confirm whether or not there is data already reproduced by the reproduction data of the priority data among the decoded data with reference to the determination content stored in the storage section; and an interpolation data generation section configured to generate interpolation data for connecting the reproduction data of the priority data and the decoded data in a case where the reproduction data of the priority data is already reproduced by the reproduction completion confirmation section, wherein the storage section, the reproduction completion confirmation section, and the interpolation data generation section are each implemented via at least one processor.

8. An information processing method, comprising:

by an information processing apparatus at a transmission point, acquiring data relating to the transmission point, encoding the data relating to the transmission point, on a basis of a situation of the transmission point recognized using the data relating to the transmission point, extracting data to be preferentially transmitted as priority data from the data relating to the transmission point, and transmitting the encoded data and the unencoded priority data to an information processing apparatus at a reception point, by the information processing apparatus at the reception point receiving the encoded data and the unencoded priority data, decoding the encoded data, determining a reproduction time and a reproduction method of the unencoded priority data, generating the reproduction data of the priority data on a basis of the determination, and outputting the decoded data and the reproduction data of the priority data.

* * * * *